(12) United States Patent
Morrison et al.

(10) Patent No.: US 10,510,500 B2
(45) Date of Patent: Dec. 17, 2019

(54) INCLUDING ONE OR MORE LENSES IN INDIVIDUAL KEYS OF A KEYBOARD TO FOCUS LIGHT

(71) Applicant: Dell Products L. P., Round Rock, TX (US)

(72) Inventors: John Trevor Morrison, Round Rock, TX (US); Kevin M. Turchin, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 280 days.

(21) Appl. No.: 15/499,674

(22) Filed: Apr. 27, 2017

(65) Prior Publication Data

US 2018/0313528 A1 Nov. 1, 2018

(51) Int. Cl.
*H01H 13/83* (2006.01)
*G06F 1/16* (2006.01)
*G06F 3/02* (2006.01)
*H01H 3/12* (2006.01)

(52) U.S. Cl.
CPC ........... *H01H 13/83* (2013.01); *G06F 1/1616* (2013.01); *G06F 1/1662* (2013.01); *G06F 3/0213* (2013.01); *H01H 3/125* (2013.01); *H01H 2219/037* (2013.01); *H01H 2219/066* (2013.01); *H01H 2221/07* (2013.01)

(58) Field of Classification Search
CPC ...................................................... H01H 13/83

USPC ....................................................... 362/23.03
See application file for complete search history.

(56) References Cited

U.S. PATENT DOCUMENTS

| | | | |
|---|---|---|---|
| 2011/0147182 A1* | 6/2011 | Chen ...................... | H01H 13/83 200/314 |
| 2012/0298491 A1* | 11/2012 | Ozias .................... | G06F 1/1662 200/314 |
| 2013/0163223 A1* | 6/2013 | Pance .................... | G06F 3/0202 362/23.03 |
| 2014/0104782 A1* | 4/2014 | Lin .......................... | H05K 7/02 361/679.44 |
| 2014/0166458 A1* | 6/2014 | Chen ................... | H03K 17/9622 200/5 A |

* cited by examiner

*Primary Examiner* — Sean P Gramling
(74) *Attorney, Agent, or Firm* — Campbell Stephenson LLP; Shiv S. Naimpally

(57) ABSTRACT

In some examples, a computing device may include a first housing coupled to a second housing. The first housing may include a first set of components including a display device. The second housing may include a second set of components including a keyboard and a light source that emits light. An individual key of the keyboard may include one or more lenses. The one or more lenses may focus the light towards an area below an individual keycap of the individual key. For example, the one or more lenses may be integrated into a scissor mechanism of the individual key. The keycap may include an opaque material into which is embedded a character or a symbol made of a transparent or translucent material through which the light is visible.

20 Claims, 6 Drawing Sheets

NORMAL (KEY NOT PRESSED)

KEY PRESSED

INCLUDING ONE OR MORE LENSES IN INDIVIDUAL KEYS OF A KEYBOARD TO FOCUS LIGHT

BACKGROUND OF THE INVENTION

Field of the Invention

This invention relates generally to computing devices having a keyboard and, more particularly, to using one or more lenses to illuminate each keycap.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A keyboard (e.g., QWERTY-based) may be used to provide input to a computing device. For example, a keyboard may be integrated into a computing device, such as a laptop, tablet, phone, or other portable computing device. As another example, a standalone keyboard may be used to provide input to a desktop computing device, a tablet computing device, or other computing device that does not include an integrated computing device. Many keyboards provide illuminated keyboards to enable users to view the keys in poorly lit environments. However, achieving relatively uniform illumination of each keycap of the keyboard may be challenging for a variety of reasons.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a computing device may include a first housing coupled to a second housing. The first housing may include a first set of components including a display device. The second housing may include a second set of components including a keyboard and a light source that emits light. An individual key of the keyboard may include one or more lenses. The one or more lenses may focus the light towards an area below an individual keycap of the individual key. For example, the one or more lenses may be integrated into a scissor mechanism of the individual key. The keycap may include an opaque material into which is embedded a character or a symbol made of a transparent or translucent material through which the light is visible.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
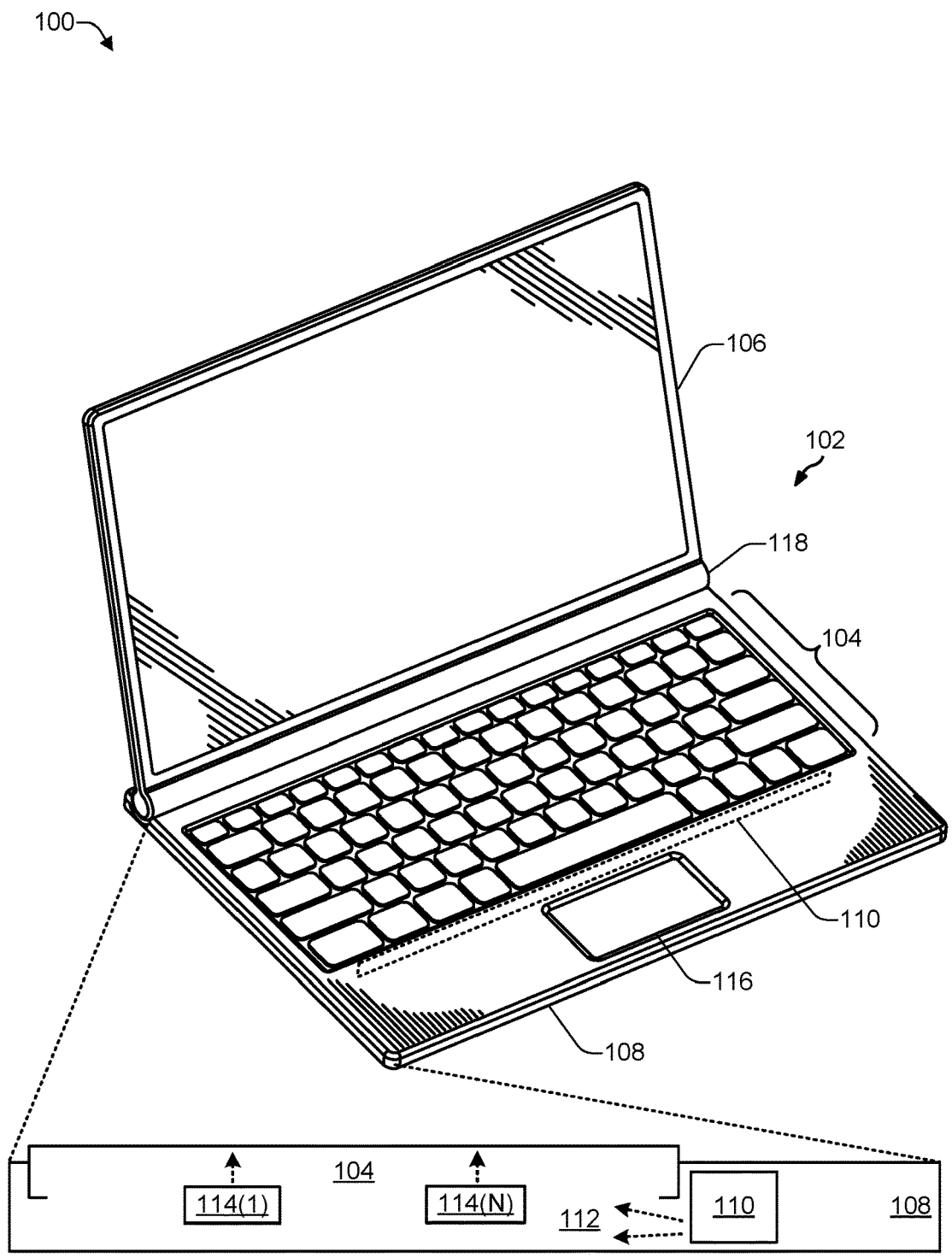
FIG. 1 is a block diagram of an architecture of a computing device that includes an illuminated keyboard according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein may use one or more lenses integrated into each key mechanism of a keyboard to focus illumination (e.g., light) onto the keycap of each key. For example, each key mechanism may include a scissor mechanism to hold the keycap above an electrical connection. When the user applies more than a predetermined amount of pressure to the keycap, the scissor mechanism may decrease in height and contact the electrical connection, causing the electrical connection to register a key press associated with that particular key.

The keyboard may be housed in a keyboard housing. To illuminate the keys, a light source may be positioned at one end of the keyboard housing. The light source may emit light horizontally inside the keyboard housing. The light source may include one or more light emitting devices, such as, for example, light emitting diodes (LEDs), organic LED (OLED), liquid crystal display (LCD), another type of light emitting device, or any combination thereof.

One or more lenses may be integrated (e.g., attached) to the scissor mechanism. Each lens may be made out of glass, plastic, polycarbonate, or any combination thereof. The one or more lenses may be used to focus the light (e.g., emitted by the light source) on to a bottom of the keycap to illuminate the keycap. For example, each keycap may be made of an opaque material with an alphanumeric character or symbol approximately in the center of the keycap. The alphanumeric character or symbol may be made of a transparent, translucent, or other type of material that enables the focused light to shine through the keycap to identify each key.

In a first example, a computing device may include a first housing and a second housing. The first housing may include a first set of components and the second housing may include a second set of components, such as (i) a keyboard having a plurality of keys and (ii) a light source that emits light within the second housing to illuminate a plurality of keycaps of the keyboard. The keyboard may include one or more lenses to focus the light at particular areas (e.g., just below individual keycaps of the plurality of keycaps) in the keyboard. An individual key of the plurality of keys may include a keycap and a scissor mechanism into which is integrated one or more lenses. An individual lens of the one or more lenses may be a convergent lens that focuses the light in an area near (e.g., just below) an individual keycap. The keycap may include an opaque material. An alphanumeric character or symbol made of a transparent material or a translucent material may be embedded into the keycap. The keycap may include plastic material, polycarbonate material, or glass. The scissor mechanism may include plastic material or polycarbonate material. Individual lenses of the one or more lenses may include a plastic material, a polycarbonate material, glass, or any combination thereof.

In a second example, a computing device may include a first housing and a second housing. The first set housing may include a first set of components, such as a display device. The second housing may include (i) a second set of components, such as a keyboard having a plurality of keys, and (ii) a light source to emit light within the second housing. Individual keys of the keyboard may include one or more lenses to focus the light towards an area below (e.g., adjacent to a bottom of) individual keycaps of the individual keys. The one or more lenses may include one lens, two lenses, three lenses, or at least four lenses. The individual keys of the keyboard may include a keycap having a character or a symbol embedded into the keycap. The keycap may include an opaque material and the character or the symbol may include a transparent material or a translucent material. The individual keys may include a scissor mechanism to which is attached the one or more lenses. Individual keys of the keyboard may include at least one of plastic material, polycarbonate material, or glass material. When the computing device comprises a laptop device, the first housing may be connected to the second housing by one or more hinges. When the computing device comprises a 2-in-1 device, a mechanism may (1) enable the first housing to be connected to the second housing for use as a laptop device and (2) enable the first housing to be detached from the second housing to enable the first housing to be used as a tablet computing device. When the computing device comprises a desktop device, the first housing is separate from the second housing.

In a third example, a computing device may include a first housing and a second housing. The first housing may include a first set of components, such as a display device. The second housing may include a second set of components, such as (i) a keyboard having a plurality of keys, (ii) a touchpad, and (iii) a light source to emit light within the second housing. An individual key of the keyboard may include one or more lenses to focus the light at a particular area (e.g., at a backlight area of each keycap of each key). The light source may include one or more of a light emitting diode (LED) or an organic LED (OLED). The individual key of the keyboard may include a keycap and a scissor mechanism into which is integrated the one or more lenses. Individual lenses of the one or more lenses may focus the light at an area near (e.g., just below a bottom of) the keycap. The keycap may include an opaque material into which is embedded a character or a symbol made of a transparent or a translucent material. The individual key of the keyboard may include at least one of plastic material, polycarbonate material, or glass material.

FIG. 1 is a block diagram of an architecture 100 of a computing device 102 that includes an illuminated keyboard 104 according to some embodiments. The computing device 102 may include two housings, a first housing 106 and a second housing 108. The first housing 106 may house a display device. The second housing 108 may house the keyboard 104. When the computing device 102 comprises a laptop device, the first housing 106 may be connected to the second housing 108 by a mechanism 118, such as one or more hinges. When the computing device 102 comprises a 2-in-1 device, the mechanism 118 may enable the first housing 106 to be connected to the second housing 108 for use as a laptop device and may enable the first housing 106 to be detached from the second housing 108 to enable the first housing 106 to be used as a tablet computing device. When the computing device 102 comprises a desktop device, the first housing 106 may be separate from the second housing 108.

To illuminate the keys of the keyboard 104, the second housing 108 may include a light source 110 positioned at one end of the second housing 108. The light source 110 may emit light 112 horizontally across the inside of the second housing 108. The light source 110 may include one or more light emitting devices, such as, for example, light emitting diodes (LEDs), organic LED (OLED), liquid crystal display (LCD), another type of light emitting device, or any combination thereof. Of course, the keyboard 104 may include a means, such as a switch, to turn on the light source 110 when the user desires that the keys of the keyboard 104 be illuminated and to turn off the light source 110 when the user desires that they keys of the keyboard 104 not be illuminated.

In a conventional keyboard that does not include lenses, the light 112 may be distributed unevenly, e.g., keys of the keyboard 104 that are located closer to the light source 110 may appear brighter than keys of the keyboard 104 that are located farther from the light source 110. In contrast, in the keyboard 104, lenses 114(1) to 114(N) (where N>1) may be used to focus the light 112 on the keycaps of the keys in the keyboard 104. The second housing 108 may include additional input devices, such as a touchpad 116. The first housing 106 may be coupled to the second housing 108 by one or more hinges 118.

Thus, multiple lenses may be located in a keyboard and used to redirect light emitted by a light source. For example, the light source may be positioned at one end of the keyboard housing and emit light approximately horizontally across the bottom of the keyboard housing. The multiple lenses in the keyboard may redirect the light upwards, towards the keycaps of the keyboard. In this way, the light from the light source may be more evenly distributed across the keys of the keyboard, resulting in more efficient use of the light from the light source, thereby reducing light loss. Because less light may be lost by using lenses, the brightness of the light source may be reduced to reduce the light source's power consumption. Reducing power consumption by the light source may enable the computing device 102 to operate for a longer period of time on a single battery charge. Reducing power consumption by the light source may enable the computing device 102 to reduce an amount of heat generated by the light source. Thus, placing lenses in the keyboard to re-direct light from the light source towards the keycaps may result in more even distribution of light among the keys, reduced power consumption, reduced heat generation, and increased battery life.

Figure 2:
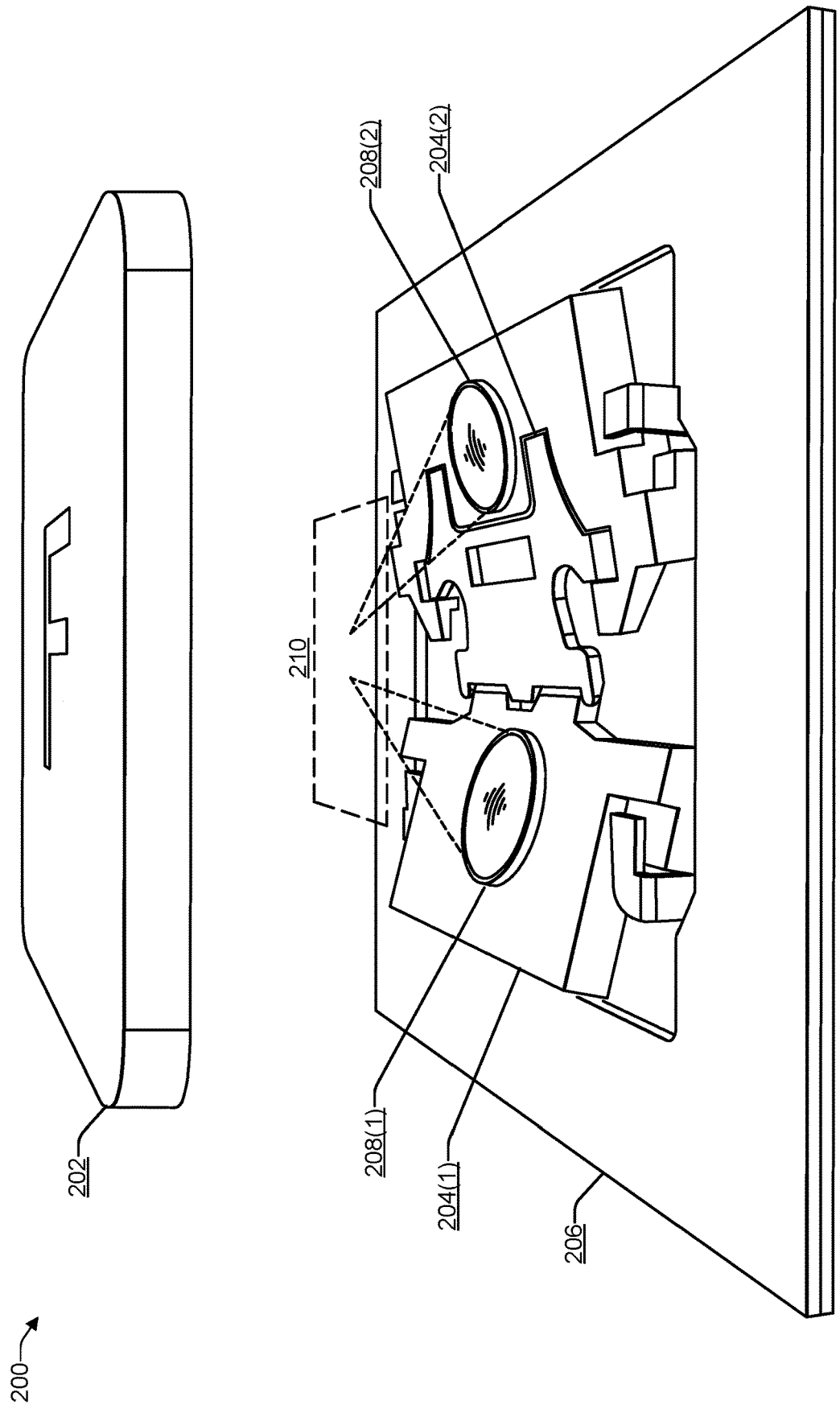
FIG. 2 is a block diagram illustrating lenses integrated into a key mechanism according to some embodiments.

FIG. 2 is a block diagram illustrating lenses integrated into a key mechanism 200 according to some embodiments. For example, each of the keys of the keyboard 104 of FIG. 1 may use a mechanism similar to the key mechanism 200. A keycap 202 (e.g., of the character "F") may be placed above a scissor mechanism 204. The scissor mechanism 204 may be attached to a base 206. When a user applies an amount of pressure that is greater than a predetermined amount to the keycap 202, the scissor mechanism 204 may move from a first height to a second height (e.g., that is lower than the first height), and cause the keyboard 104 of FIG. 1 to register a key press of a particular key (e.g., the "F" key is illustrated in FIG. 2).

Figure 5:
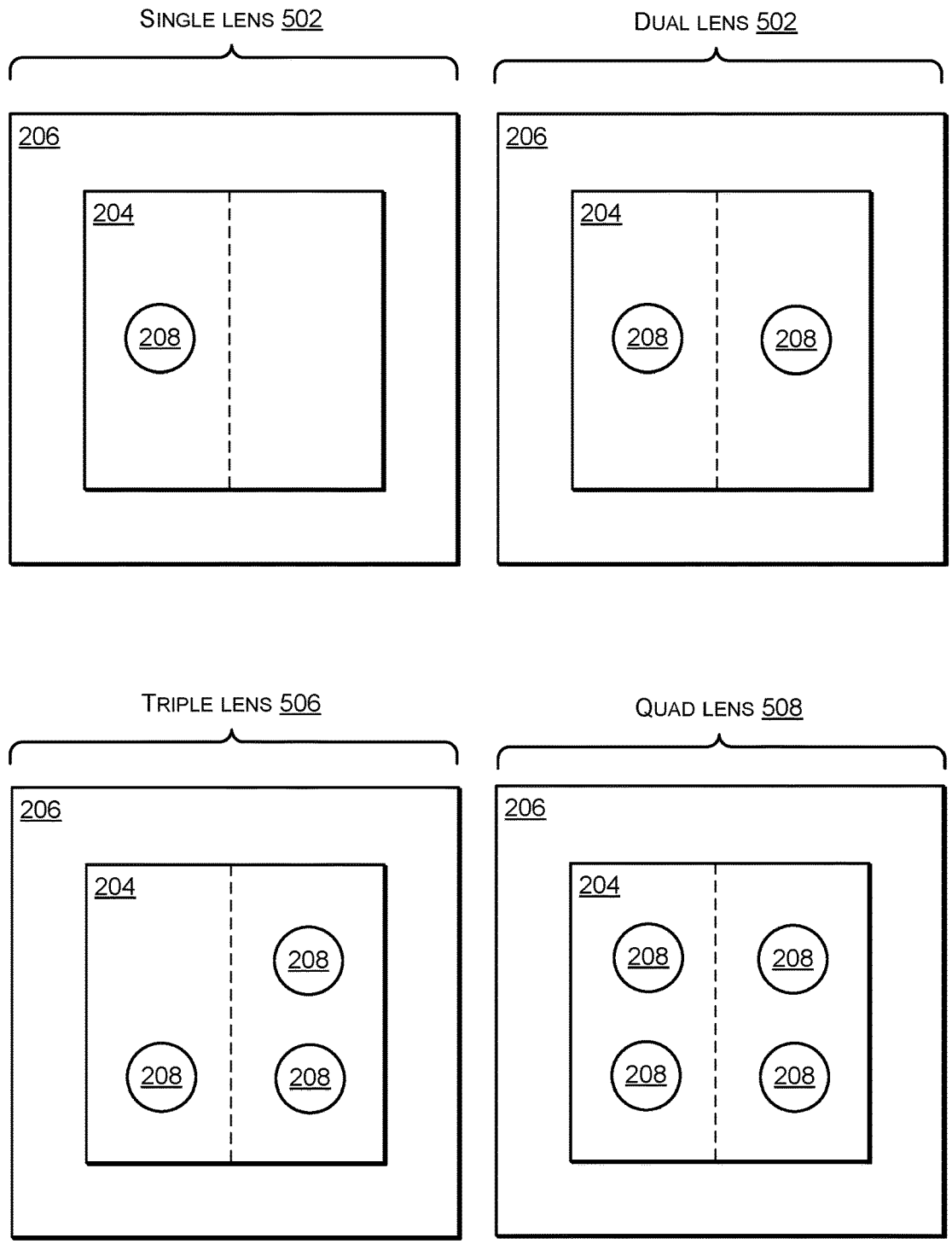
FIG. 5 is a block diagram illustrating different lens configurations according to some embodiments.

As illustrated in FIG. 2, two lenses, 208(1) and 208(2), may be integrated with (e.g., attached to) the scissor mechanism 204. Of course, in other embodiments, less than two lenses (e.g., one lens) or more than two lenses (e.g., three lenses, four lenses, or the like) may be integrated into the scissor mechanism 204, as illustrated in FIG. 5.

The lenses 208 may be convergent lenses that are positioned to focus the light 112 (of FIG. 1) to an area 210. The area 210 may be a backlight location for the keycap 202 when the keycap 202 is attached to the scissor mechanism 204. For example, the area 210 may illuminate the alphanumeric character or symbol on the keycap 202.

Thus, one or more lenses 208 may be integrated into the key mechanism 200 of each key of a keyboard (e.g., the keyboard 104 of FIG. 1). The lenses 208 may be convergent lenses that are positioned in the key mechanism 200 to focus light from a light source (e.g., the light 112 from the light source 110 of FIG. 1) in an area that backlights the keycap 202.

Figure 3:
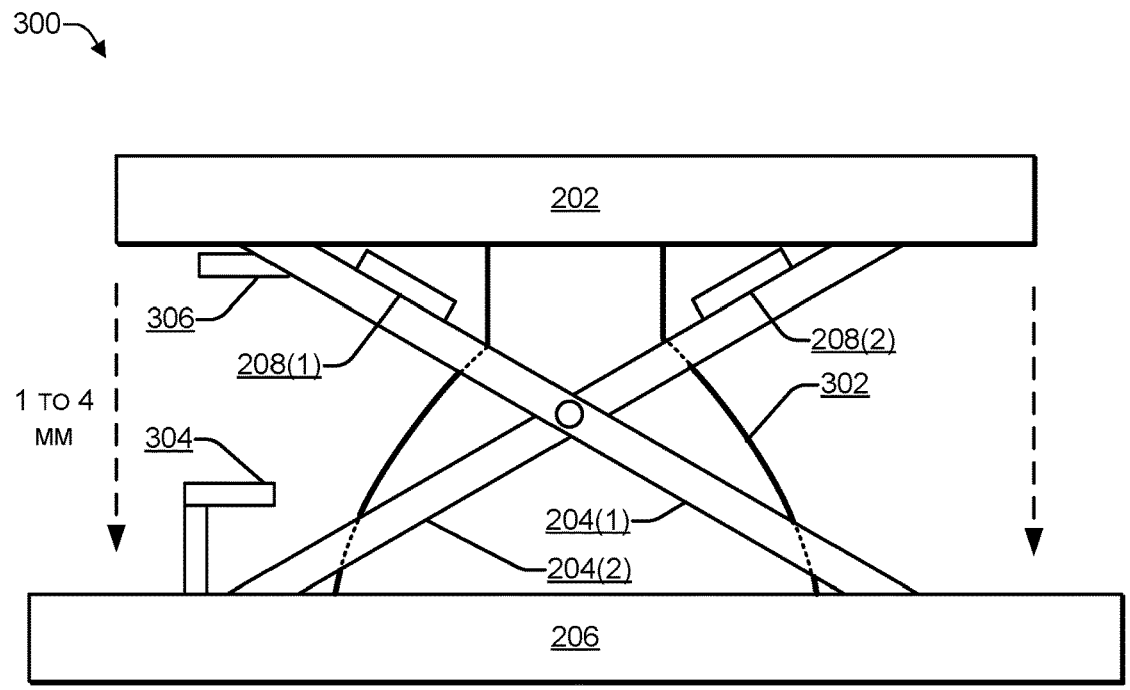
FIG. 3 is a block diagram illustrating the operation of a scissor mechanism according to some embodiments.
Figure 3:
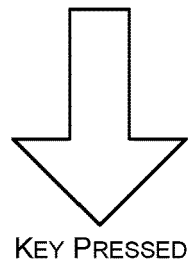
Figure 3:
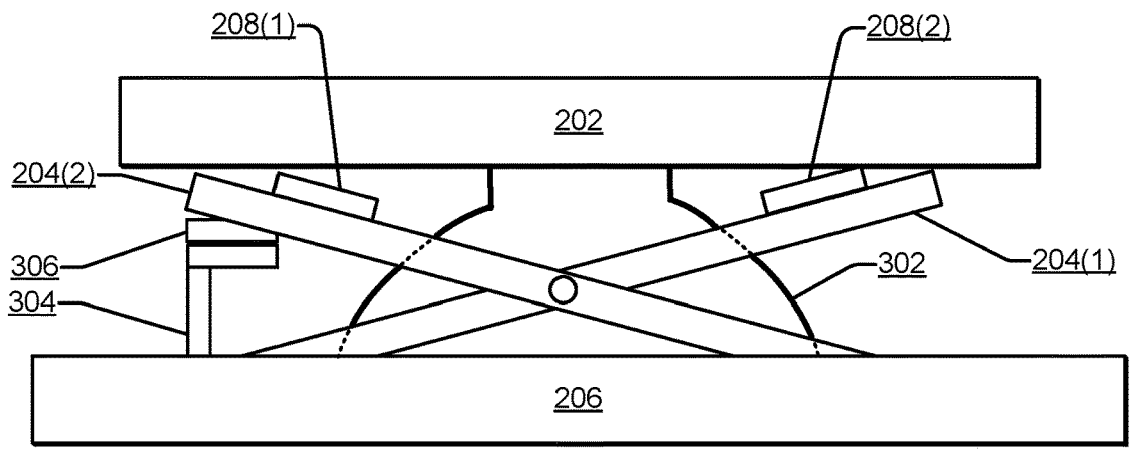

FIG. 3 is a block diagram 300 illustrating the operation of a scissor mechanism according to some embodiments. The keys are attached to the keyboard 104 of FIG. 1 via two pieces 204(1) and 204(2) that interlock similar to a pair of scissors. In some cases, a dome 302 may be used to protect the components of the key mechanism from dirt and debris. The dome 302 may be made of one or more materials, such as plastic, metal, rubber, another type of material, or any combination thereof. The key mechanism illustrated in FIG. 3 shows a first portion 304 of a switch that is part of the base 206 and a second portion 306 of the switch that is part of the scissor mechanism 204. The top half of FIG. 3 shows the scissor mechanism when the keycap 202 is not depressed. The bottom half of FIG. 3 shows the scissor mechanism when the keycap 202 is depressed, causing the second portion 306 to make contact with the first portion 304 of the switch, thereby causing the keyboard 104 to register (e.g., indicate to the computing device 102) a key press. Depending on the implementation, the keycap 202 may travel between 1 millimeter to 4 millimeters from the top half of FIG. 3 to the bottom half of FIG. 3.

Figure 4:
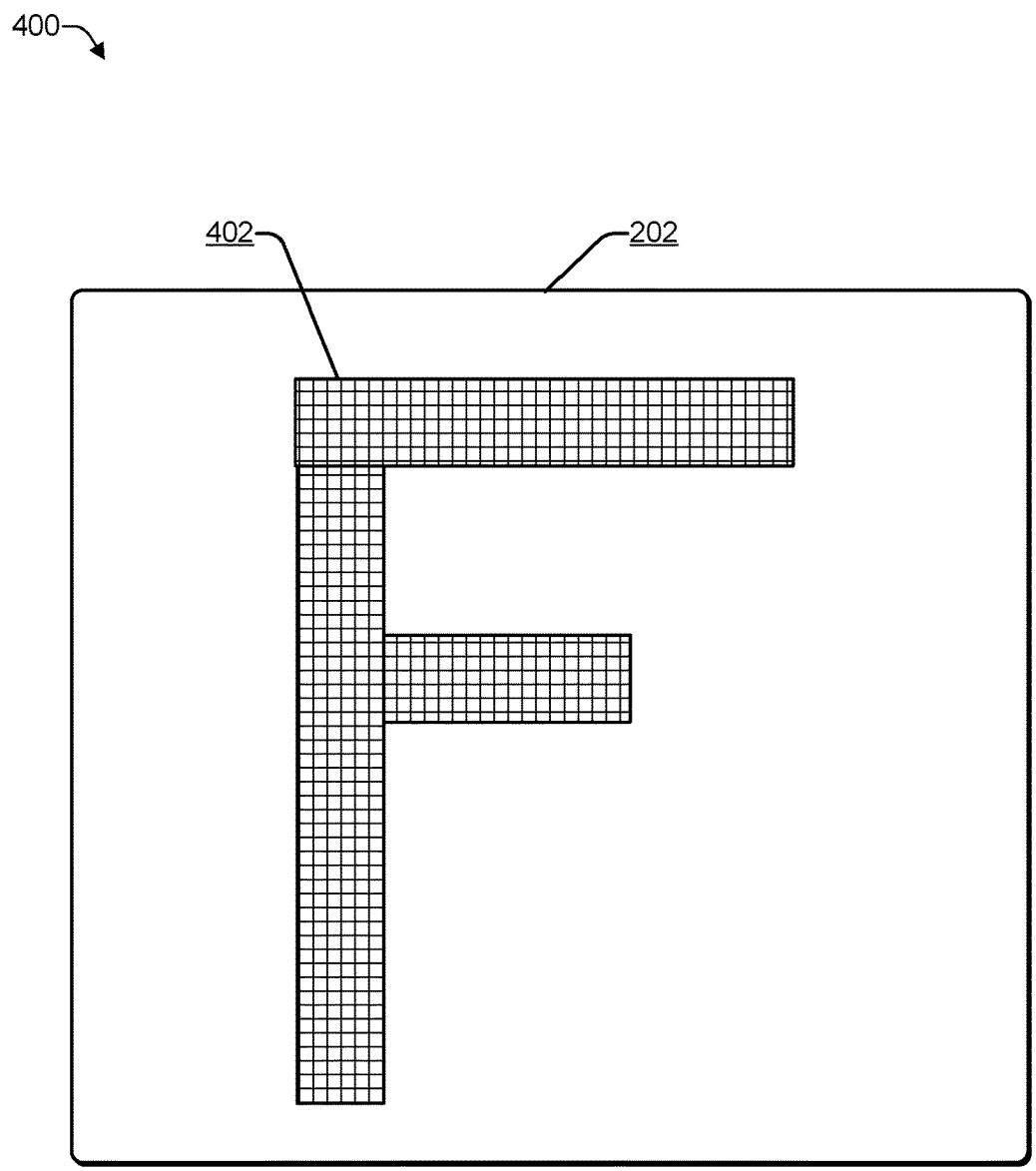
FIG. 4 is a block diagram illustrating a keycap according to some embodiments.

FIG. 4 is a block diagram 400 illustrating a keycap according to some embodiments. The keycap 202 may be made using a relatively opaque plastic, polycarbonate, or other type of material that does not let light pass through. One or more alphanumeric characters or symbols 402 may be embedded into the keycap 202. The alphanumeric characters or symbols 402 may be made using a relatively non-opaque (e.g., transparent or translucent) material that allows light to pass through. For example, the alphanumeric characters or symbols 402 may be made using a clear or a frosted material, such as plastic, polycarbonate, glass, or the like. The light 112 from the light source 110 of FIG. 1 may be directed by the lenses 208 of FIG. 2 to the alphanumeric characters or symbols 402.

FIG. 5 is a block diagram 500 illustrating different lens configurations according to some embodiments. Examples of how different numbers of lenses may be integrated into the scissor mechanism 204 are illustrated in FIG. 5. For example, a single lens configuration 502, a dual lens configuration 502, a triple lens configuration 506, and a quad lens configuration 508 are illustrated. Of course, the locations of the lenses 208 illustrated in the different lens configurations 502, 504, 506, and 508 are purely for illustration purposes. For example, in different embodiments, different locations from those illustrated in FIG. 5 may be used.

Figure 6:
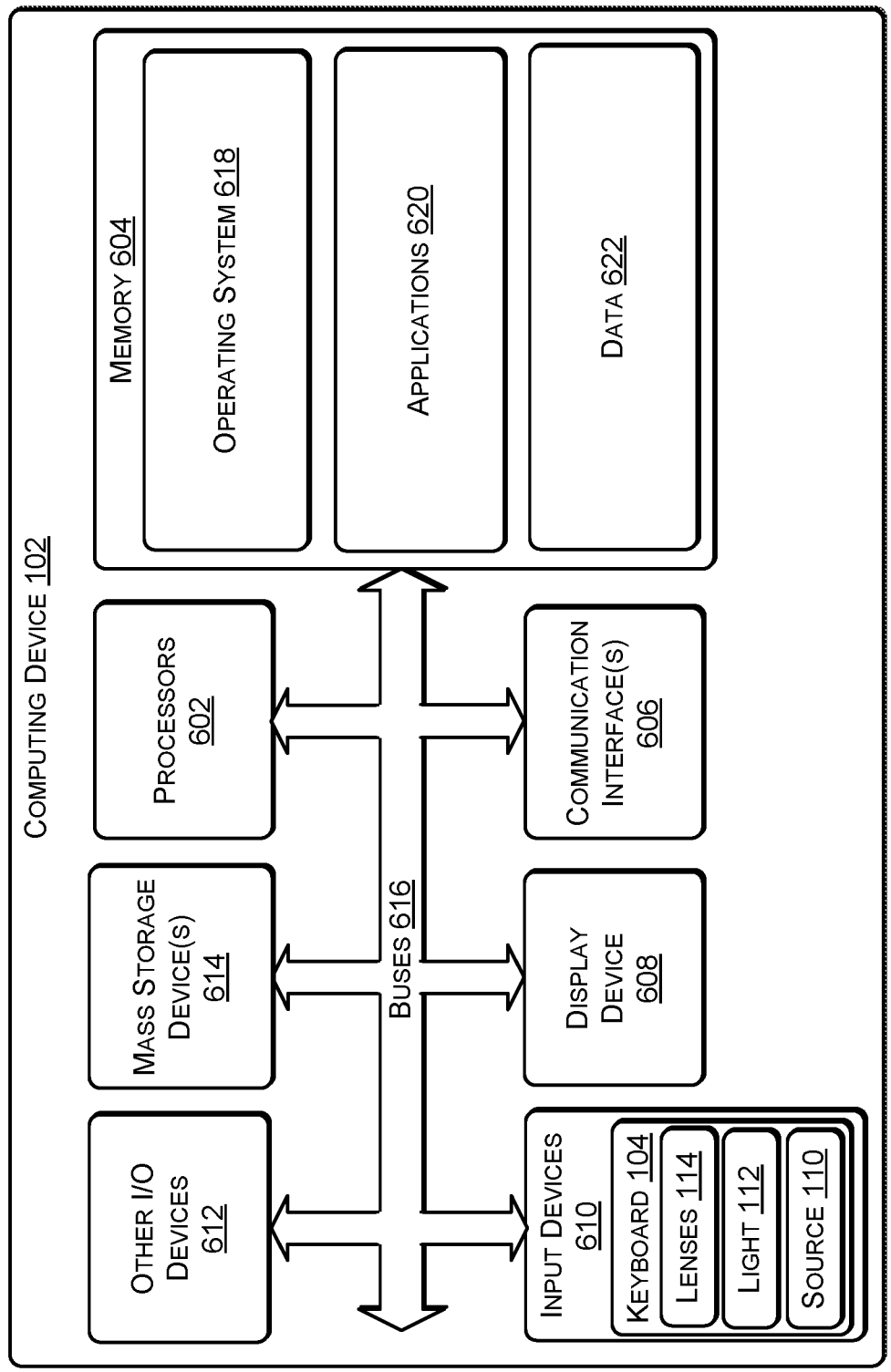
FIG. 6 illustrates an example configuration of a computing device that can be used to implement the systems and techniques described herein.

FIG. 6 illustrates an example configuration of the computing device 102 of FIG. 1 that can be used to implement the systems and techniques described herein. The computing device 102 may include one or more processors 602 (e.g., a central processing unit (CPU), graphics processing unit (GPU), and the like), a memory 604, communication interfaces 606 (e.g., Ethernet, Wi-Fi, and the like), a display device 608, input devices 610 (e.g., the keyboard 104 of FIG. 1), other input/output (I/O) devices 612 (e.g., trackball, and the like), and mass storage devices 614, configured to communicate with each other, such as via one or more system buses 616 or other suitable connections. While a single system bus is illustrated for ease of understanding, it should be understood that the system buses 616 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 602 are one or more hardware devices that may include a single processing unit or a number of processing units, all of which may include single or multiple computing units or multiple cores. The processors 602 may be implemented as one or more microprocessors, microcomputers, microcontrollers, digital signal processors, central processing units, graphics processing units, state machines, logic circuitries, and/or any hardware device that can manipulate signals based on operational instructions. Among other capabilities, the processors 602 may be configured to fetch and execute computer-readable instructions stored in the memory 604, mass storage devices 614, or other computer-readable media.

Memory 604 and mass storage devices 614 are examples of computer storage media (e.g., memory storage devices) for storing instructions that can be executed by the processors 602 to perform the various functions described herein. For example, memory 604 may include both volatile memory and non-volatile memory (e.g., RAM, ROM, or the like) devices. Further, mass storage devices 614 may include hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices 614 may be collectively referred to as memory or computer storage media herein, and may be any type of non-transitory media capable of storing computer-readable, processor-executable program instructions as computer program code that can be executed by the processors 602 as a particular machine configured for carrying out the operations and functions described in the implementations herein.

The computing device 102 may also include one or more communication interfaces 606 for exchanging data via a network. The communication interfaces 606 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 606 can also provide communication with external storage, such as a storage array, network attached storage, storage area network, cloud storage, or the like.

The computer storage media, such as memory 604 and mass storage devices 614, may be used to store software and data. For example, the computer storage media may be used to store an operating system 618 of the computing device 102 and software applications 620. The memory 604 may also be used to store data 622.

The multiple lenses 114 may be located in the keyboard 104 (e.g., one of the input devices 610) and used to redirect the light 112 emitted by the light source 110. For example, the light source 110 may be positioned at one end of a keyboard housing and may emit light approximately horizontally across the bottom of the keyboard housing. The multiple lenses 114 in the keyboard 104 may redirect the light upwards, towards the keycaps of the keyboard 104. In this way, the light 112 from the light source 110 may be more evenly distributed across the keys of the keyboard 104, resulting in more efficient use of the light 112 from the light source 110, thereby reducing light loss. Because less light may be lost by using the lenses 114, the brightness of the light source 110 may be reduced to reduce the light source's power consumption. Reducing power consumption by the light source 110 may enable the computing device 102 to operate for a longer period of time on a battery charge. Reducing power consumption by the light source 110 may enable the computing device 102 to reduce an amount of heat generated by the light source 110. Thus, placing the lenses 114 in the keyboard 104 to re-direct the light 112 from the light source 110 towards the keycaps may result in more even distribution of light among the keys, reduced power consumption, reduced heat generation, and increased battery life for the computing device 102.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   a first housing comprising:
      a first set of components; and
   a second housing comprising:
      a second set of components comprising a keyboard having a plurality of keys; and
      a single light source to emit light approximately horizontally into the second housing;
   wherein an individual key of the plurality of keys comprises:
      a keycap;
      a scissor mechanism; and
      one or more lenses attached to a top surface of the scissor mechanism, wherein an individual lens of the one or more lenses comprises a convergent lens to focus the light to an area comprising a backlight location of the keycap.

2. The computing device of claim 1, wherein:
   the keycap comprises an opaque material.

3. The computing device of claim 1, wherein:
   an alphanumeric character or symbol embedded into the keycap comprises a transparent material.

4. The computing device of claim 1, wherein:
   an alphanumeric character or symbol embedded into the keycap comprises a translucent material.

5. The computing device of claim 1, wherein the keycap comprises a plastic or a polycarbonate.

6. The computing device of claim 1, wherein the scissor mechanism comprises a plastic or a polycarbonate.

7. The computing device of claim 1, wherein individual lenses of the one or more lenses comprise a plastic or a polycarbonate.

8. A computing device comprising:
a first housing comprising:
a first set of components including a display device; and
a second housing comprising:
a second set of components comprising a keyboard having a plurality of keys; and
a single light source to emit light approximately horizontally into the second housing;
wherein an individual key of the keyboard comprises:
a keycap;
a scissor mechanism; and
one or more convergent lenses located on a top surface of the scissor mechanism to focus the light towards an area below an individual keycap of the individual keys to illuminate an alphanumeric character or a symbol on the individual keycap.

9. The computing device of claim 8, wherein:
the computing device comprises a laptop device; and
the first housing is connected to the second housing by one or more hinges.

10. The computing device of claim 8, wherein:
the computing device comprises a 2-in-1 device;
a mechanism enables the first housing to be connected to the second housing for use as a laptop device; and
the mechanism enables the first housing to be detached from the second housing to enable the first housing to be used as a tablet computing device.

11. The computing device of claim 8, wherein:
the computing device comprises a desktop device; and
the first housing is separate from the second housing.

12. The computing device of claim 8, wherein the individual keys of the keyboard comprise:
a keycap having a character or a symbol embedded into the keycap, wherein the keycap comprises an opaque material and the character or the symbol comprises a transparent material or a translucent material; and
a scissor mechanism to which is attached the one or more lenses.

13. The computing device of claim 8, wherein individual keys of the keyboard include at least one of plastic material, polycarbonate material, or glass material.

14. A housing comprising:
a set of components comprising:
a keyboard having a plurality of keys;
a touchpad; and
a single light source emitting light approximately horizontally into the housing;
wherein an individual key of the keyboard comprises:
a keycap;
a scissor mechanism; and
one or more lenses attached to a top surface of the scissor mechanism to focus the light at a particular area beneath an individual keycap of the individual key to backlight the individual keycap.

15. The housing of claim 14, wherein:
the single light source comprises one or more of a light emitting diode (LED) or an organic LED (OLED).

16. The housing of claim 14, wherein the individual key of the keyboard further comprises:
the individual keycap; and
a scissor mechanism into which is integrated the one or more lenses, wherein individual lenses of the one or more lenses focus the light at an area near the individual keycap.

17. The housing of claim 14, wherein:
the individual keycap comprises an opaque material.

18. The housing of claim 14, wherein the individual keycap further comprises an embedded character or an embedded symbol made of a transparent material or a translucent material.

19. The housing of claim 14, wherein the individual key of the keyboard includes at least one of plastic material, polycarbonate material, or glass material.

20. The housing of claim 14, wherein the housing comprises a portion of a computing device.

* * * * *